(12) United States Patent
Greenbacker et al.

(10) Patent No.: US 11,797,621 B2
(45) Date of Patent: Oct. 24, 2023

(54) SYSTEMS FOR LEVERAGING ADDITIONAL USER DATA IN RESOURCE TRANSFER EVENT MESSAGING FOR GENERATING CUSTOMIZED AND REFINED BROWSING EXPERIENCES

(71) Applicant: BANK OF AMERICA CORPORATION, Charlotte, NC (US)

(72) Inventors: Robertson Walters Greenbacker, Charlotte, NC (US); Tony England, Tega Cay, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 284 days.

(21) Appl. No.: 17/215,751

(22) Filed: Mar. 29, 2021

(65) Prior Publication Data

US 2022/0309113 A1    Sep. 29, 2022

(51) Int. Cl.
- G06F 16/00       (2019.01)
- G06F 16/9535   (2019.01)
- G06Q 20/38      (2012.01)
- H04L 9/40         (2022.01)
- G06F 16/954     (2019.01)

(52) U.S. Cl.
CPC ........ G06F 16/9535 (2019.01); G06F 16/954 (2019.01); G06Q 20/388 (2013.01); G06Q 20/3821 (2013.01); H04L 63/08 (2013.01)

(58) Field of Classification Search
CPC ............. G06Q 20/3821; G06Q 20/388; G06Q 20/027; G06Q 50/186; G06F 16/9535; G06F 16/954; G06F 21/6218; G06F 21/44; G06N 5/04
See application file for complete search history.

(56) References Cited

U.S. PATENT DOCUMENTS

| | | | |
|---|---|---|---|
| 9,940,653 B1* | 4/2018 | Rygaard | G06F 21/6254 |
| 2013/0298215 A1* | 11/2013 | Kuznetsov | H04L 9/3263 726/8 |
| 2017/0366422 A1* | 12/2017 | Castinado | H04W 4/02 |
| 2018/0089455 A1* | 3/2018 | Castinado | G06F 21/6218 |
| 2018/0315143 A1* | 11/2018 | Rang | G06Q 50/186 |

\* cited by examiner

Primary Examiner — Yicun Wu
(74) Attorney, Agent, or Firm — Moore & Van Allen PLLC; James C. Edwards

(57) ABSTRACT

Additional user data in resource transfer event messaging is leveraged for generating customized and refined web browsing experiences. Resource transfer messages are configured to include, not only the user data required to affect the resource transfer, but other user data related to the resource transfer event, such as user preference data. The resource transfer event messages are communicated to a resource storage entity, which stores the other user data in resource transfer event repository. In response to a user authenticating with the resource storage entity and accessing a distributed communication network, such as the Internet or the like, the user records are accessed and the additional user data is used to customize the websites that the user navigates.

17 Claims, 9 Drawing Sheets

SYSTEMS FOR LEVERAGING ADDITIONAL USER DATA IN RESOURCE TRANSFER EVENT MESSAGING FOR GENERATING CUSTOMIZED AND REFINED BROWSING EXPERIENCES

FIELD OF THE INVENTION

The present invention is generally directed to customizing/refining web browsing experiences and, more specifically, system that leverage the use of additional user data, besides resource account identifier data, in resource transfer event messaging for generating customized and refined user web browsing experiences.

BACKGROUND

A need exists to provide improved user experiences when browsing websites. In addition to improving the user experience, a need exists to limit exposure to personal data. In this regard, a need exists to be able to customize/personalize websites without having to store a user's personal information at the website or browser-level.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods and/or the like that leverage the use of additional user data in resource transfer event messaging for generating customized and refined browsing experiences. In this regard, resource transfer messages are configured to include, not only the user data required to affect the resource transfer (e.g., resource repository identifier and the like), but other user data related to the resource transfer event. The other user data may include, but is not limited to, user preference data, such as preferences (e.g., sizes, colors and the like) for the object or service being acquired, a geographic location preference for delivery of the object or performance of the service, a contact preference (e.g., email address, telephone number or the like) for corresponding with the resource provider and the like.

The resource transfer event messages are communicated to the resource storage entity that is associated with the resource transfer event and stores the resource provider's resource repository. In this regard, the resource storage entity provides for a database or other storage mechanism that stores user records that associate the resource provider with the resource transfer event and include the other user data related to the resource transfer event.

In response to a user authenticating with the resource storage entity and access a distributed communication network, such as the Internet or the like, the user records are accessed and the user's additional user data is used to customize the websites that the user navigates.

Moreover, in specific embodiments of the invention, further logic, such as artificial intelligence or the like may be executed in conjunction with the additional user information (e.g., user preferences associated with objects/services previously acquired) to determine/refine the customization of the websites.

In other specific embodiments of the invention, the additional user information is used in configuring a resource transfer event once a user selects an object or service for acquisition. In this regard, only a single user input may be required to acquire an object or service, since the resource storage entity stores in the user record all the additional information needed for configuring a resource transfer event, such as, but not limited to, object or service preferences (e.g., sizes, colors and the like), a geographic location preference for delivery of the object or performance of the service, a contact preference for corresponding with the resource provider and the like.

A system for customizing network browsing experiences defines first embodiments of the invention. The system includes a first computing platform including a first memory and at least one first processor in communication with the first memory. The first memory stores a user database that is controlled by a resource storage entity and executable by the at least one first processor. The user database is configured to store user data for a plurality of users. The user data associates each of the plurality of users with user preference data received via resource transfer event messages communicated to the resource storage entity during resource transfer events. The user preference data includes object or service preferences.

The system further includes a second computing platform having a second memory and at least one second processor in communication with the second memory. The second memory stores instructions that are executable by the at least one second processor. The instructions are configured to receive authentication credentials from a user from amongst the plurality of users, and authenticate the user based on comparing the received authentication credentials and user authentication credentials stored at the resource storage entity. The instructions are further configured to, in response to authenticating the user, provide the user access to a network configured for resource transfer events. In addition, the instructions are configured to, in response to the user navigating to a network site in the network, access the user database to retrieve the user preference data associated with the user, and customize content provided to the user while browsing the network site based on the object or service configuration preference data.

In specific embodiments of the system, the user data base is further configured to store the user data that associates each of the plurality of users with the user preference data, the user preference data further including a geographic location preference for distributing objects or performing services acquired in a resource transfer event, and a contact information preference. In related embodiments of the system, the instructions are further configured to, in response to receiving a single user input that selects an object or service at the network site for acquisition or performance, (1) access the resource storage entity to obtain (i) resource transfer event credentials associated with the user, and (2) access the user database to obtain (ii) the user preference data associated with the user including one or more of (a) the object or service preferences, (b) the geographic location preference, and (c) the contact information preference, and process the resource transfer event using only the resource transfer event credentials and the user preference data obtained by accessing the resource storage entity and the user database.

In other specific embodiments of the invention, the user database is further configured to store user data for a plurality of users. The user data associates each of the plurality of users with the user preference data received via the resource transfer event messages communicated to the resource storage entity during the resource transfer events, the resource transfer event messages are further defined as real-time processing messages communicated within a real-time processing network. In related embodiments of the system, the real-time processing messages are communicated in response to receiving a real-time resource transfer event request message that includes a request for user preference data.

In further specific embodiments of the system, the instructions are further configured to customize the content provided to the user by implementing artificial intelligence logic to determine one or more actual user preferences for the user by comparing data associated with objects or services offered at the network site with the user preference data.

Moreover, in further embodiments of the system, the instructions are further configured to customize the content provided to the user including presenting only objects or services that meet the object or service preferences and are currently available for acquisition or performance at the network site.

A computer-implemented method for customizing network browsing experiences defines second embodiments of the invention. The method is executable by one or more computing processing devices. The method includes storing user data for a plurality of users. The user data associates each of the plurality of users with user preference data received via resource transfer event messages communicated to the resource storage entity during resource transfer events. The user preference data includes object or service preferences. The method further includes receiving authentication credentials from a user from amongst the plurality of users, and authenticating the user based on comparing the received authentication credentials and user authentication credentials stored at the resource storage entity. In addition, the method includes, in response to authenticating the user, providing the user access to a network configured for resource transfer events. Further, the method includes, in response to the user navigating to a network site in the network, accessing the user database to retrieve the user preference data associated with the user, and customizing content provided to the user while browsing the network site based on the object or service configuration preference data.

In specific embodiments of the method, the user preference data further includes a geographic location preference for distributing objects or performing services acquired in a resource transfer event, and a contact information preference. In such embodiments the method may further includes, in response to receiving a single user input that selects an object or service at the network site for acquisition or performance, (1) access the resource storage entity to obtain (i) resource transfer event credentials associated with the user and (2) accessing the user database to obtain (ii) the user preference data associated with the user including one or more of (a) the object or service preferences, (b) the geographic location preference, and (c) the contact information preference. Further, the method includes processing the resource transfer event using only the resource transfer event credentials and the user preference data obtained by accessing the resource storage entity and the user database.

In further specific embodiments of the method, storing further includes storing the user data for the plurality of users. The user data associates each of the plurality of users with the user preference data received via resource transfer event messages communicated to the resource storage entity during the resource transfer events, and the resource transfer event messages are further defined as real-time processing messages communicated within a real-time processing network. In related embodiments of the method, the real-time processing messages are communicated in response to receiving a real-time resource transfer event request message that includes a request for user preference data.

In other specific embodiments of the method, customizing the content further includes customizing the content provided to the user by implementing artificial intelligence logic to determine one or more actual user preferences for the user by comparing data associated with objects or services offered at the network site with the user preference data.

Moreover, in additional specific embodiments of the method, customizing the content includes customizing the content provided to the user, wherein customizing includes presenting only objects or services that meet the object or service preferences and are currently available for acquisition or performance at the network site.

A computer program product including a non-transitory computer-readable medium defines third embodiments of the invention. The computer-readable medium includes a first set of codes for causing a computer to store user data for a plurality of users. The user data associates each of the plurality of users with user preference data received via resource transfer event messages communicated to the resource storage entity during resource transfer events. The user preference data includes object or service configuration preference data. Further, the computer-readable medium includes a second set of codes for causing a computer to receive authentication credentials from a user from amongst the plurality of users and a third set of codes for causing a computer to authenticate the user based on comparing the received authentication credentials and user authentication credentials stored at the resource storage entity. In addition, the computer-readable medium includes a fourth set of codes for causing a computer to, in response to authenticating the user, provide the user access to a network configured for resource transfer events. Moreover, the computer-readable medium includes a fifth set of codes for causing a computer to, in response to the user navigating to a network site in the network, access the user database to retrieve the user preference data associated with the user, and a sixth set of codes for causing a computer to customize content provided to the user while browsing the network site based on object or service configuration preference data.

In specific embodiments of the computer program product, the user preference data further includes a geographic location preference for distributing objects or performing services acquired in a resource transfer event, and a contact information preference. In related embodiments of the computer program product, the computer-readable medium further includes a seventh set of codes for causing a computer to, in response to receiving a single user input that selects an object or service at the network site for acquisition or performance, (i) access the resource storage entity to obtain resource transfer event credentials associated with the user, (ii) access the user database to obtain the user preference data associated with the user including one or more of (a) the user's preferred configuration of objects or services, (b) the user's preferred geographic location and (c) the user's preferred contact information, and (iii) process the resource transfer event using only the resource transfer event credentials and the user preference data obtained by accessing the resource storage entity and the user database.

In additional specific embodiments of the computer program product, the first set of codes are further configured to cause the computer to store the user data for the plurality of users. The user data associates each of the plurality of users with the user preference data received via resource transfer event messages communicated to the resource storage entity during the resource transfer events. The resource transfer event messages are further defined as real-time processing messages communicated within a real-time processing network. In related embodiments of the computer program product, the real-time processing messages are communicated in response to receiving a real-time resource transfer event request message that includes a request for user preference data.

Moreover, in additional embodiments of the computer program product, the sixth set of codes is further configured to cause the computer to customize the content provided to the user by implementing artificial intelligence logic to determine one or more actual user preferences for the user by comparing data associated with objects or services offered at the network site with the user preference data.

Thus, according to embodiments of the invention, which will be discussed in greater detail below, the present invention provides for leveraging the use of additional user data in resource transfer event messaging for generating customized and refined web browsing experiences. In this regard, resource transfer messages that are communicated to resource storage entities are configured to include, not only the user data required to affect the resource transfer (e.g., resource repository identifier and the like), but other user data related to the resource transfer event (e.g., user preference data, such as, but not limited to, object/service preferences, geographic location preference, contact preference and the like.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
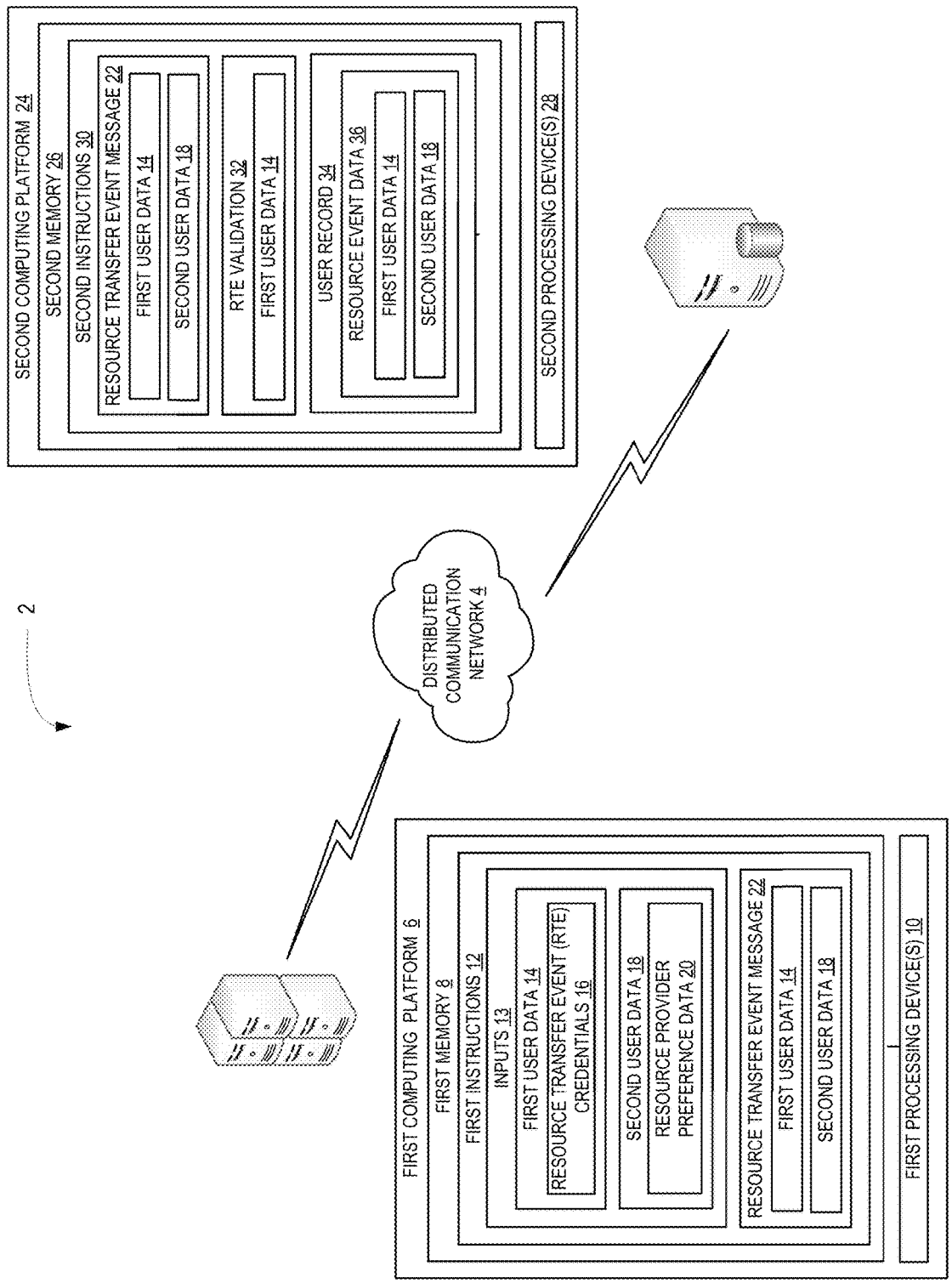
Figure 2:
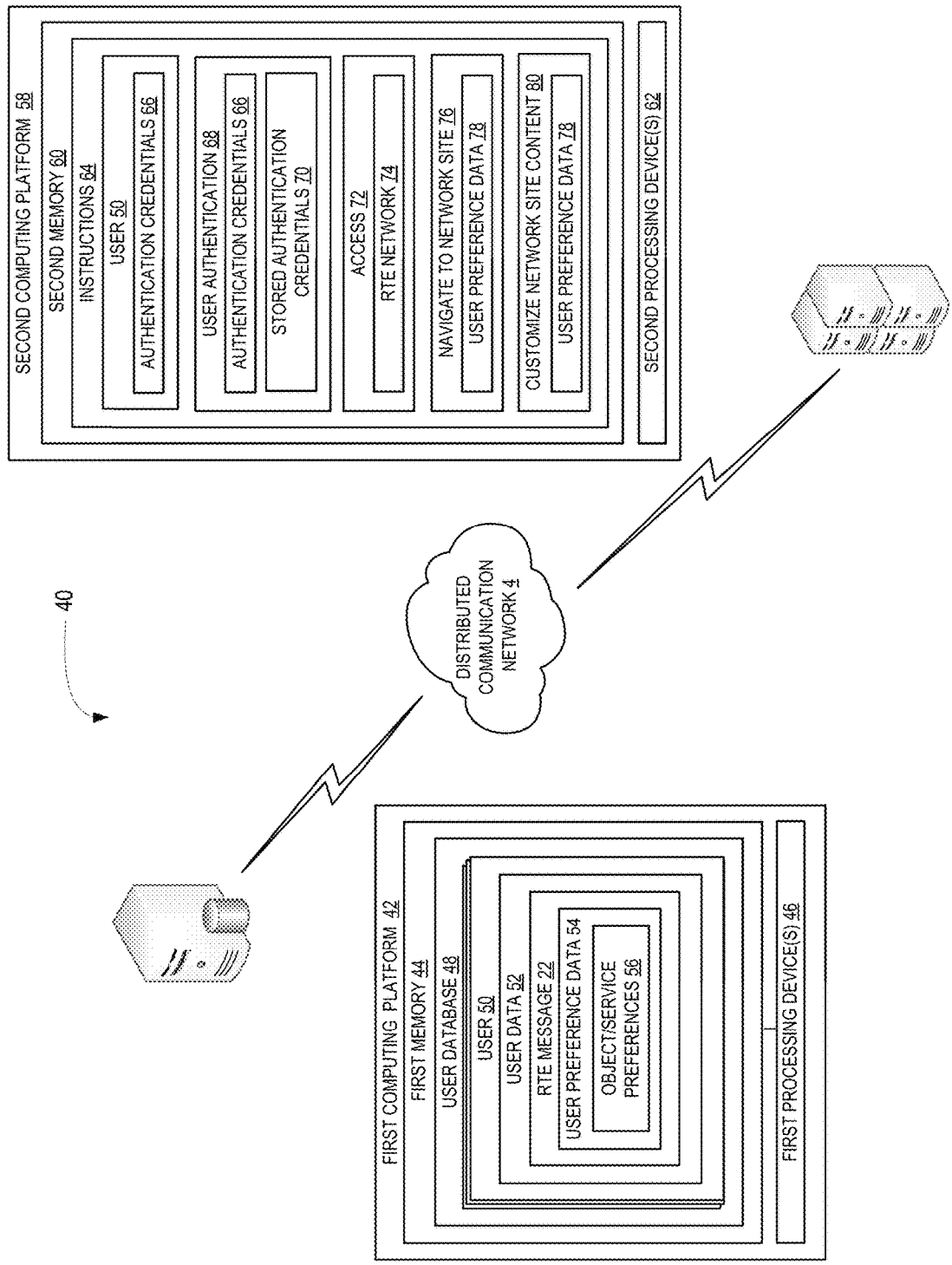
Figure 3:
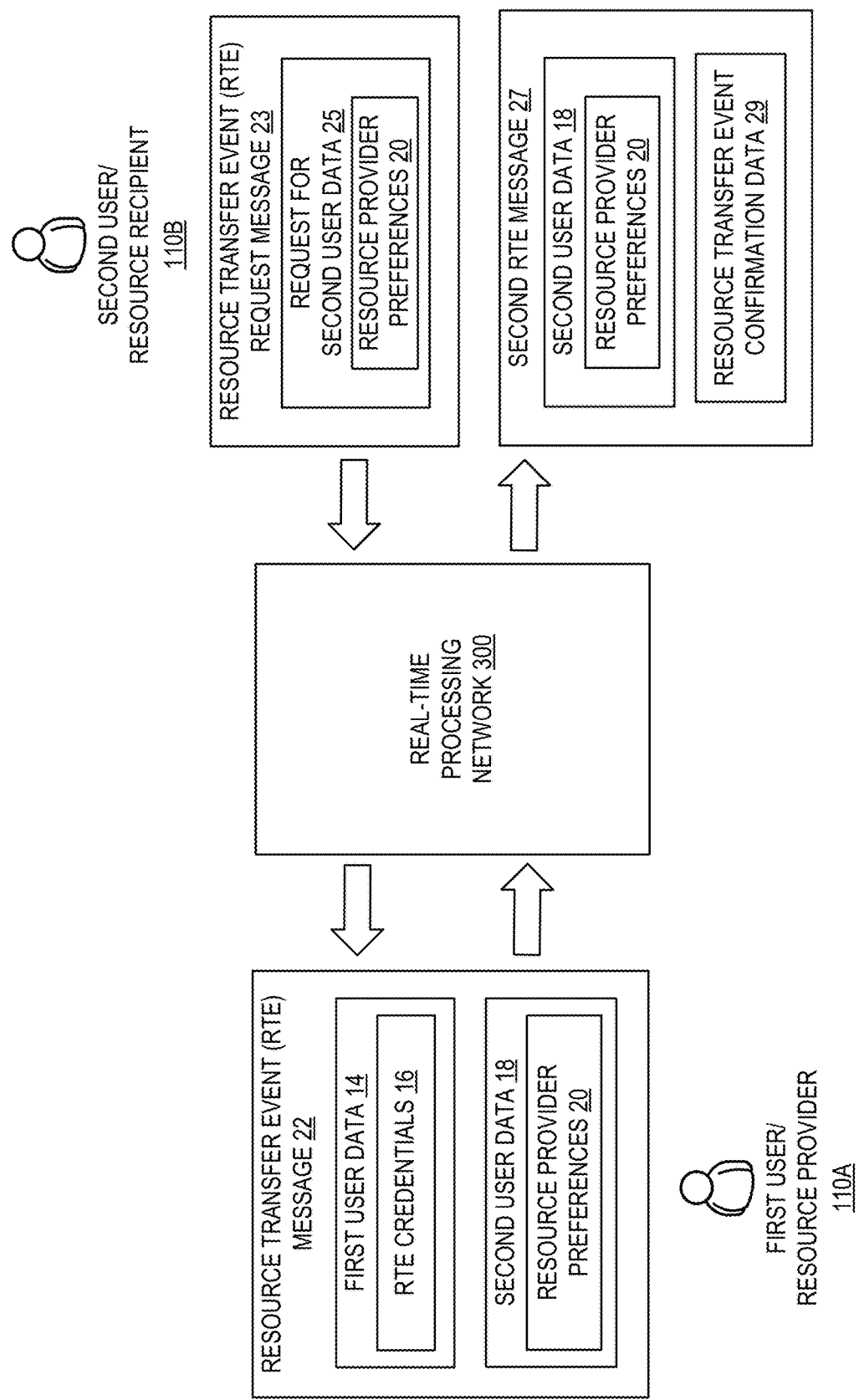
Figure 4:
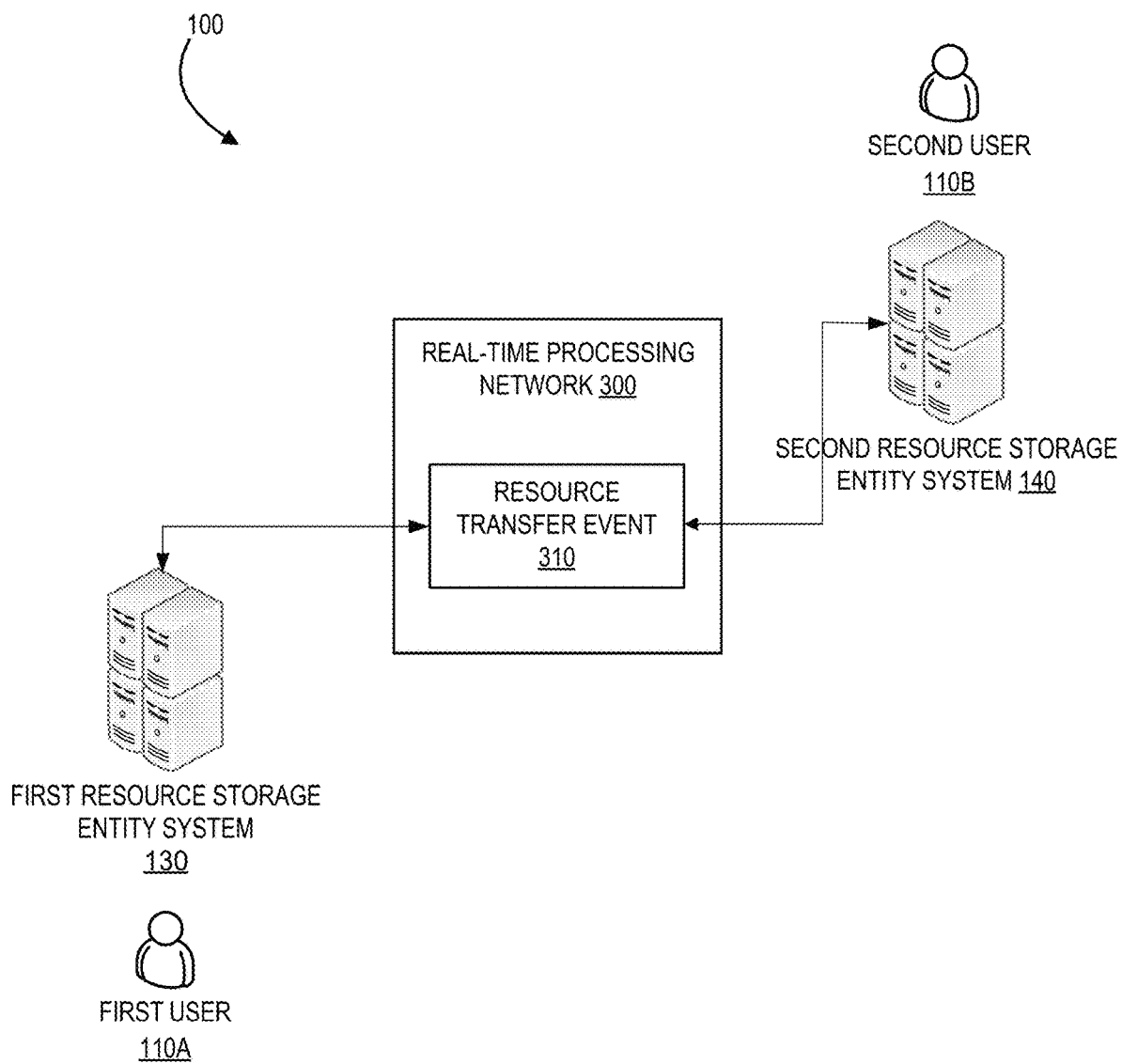
Figure 5:
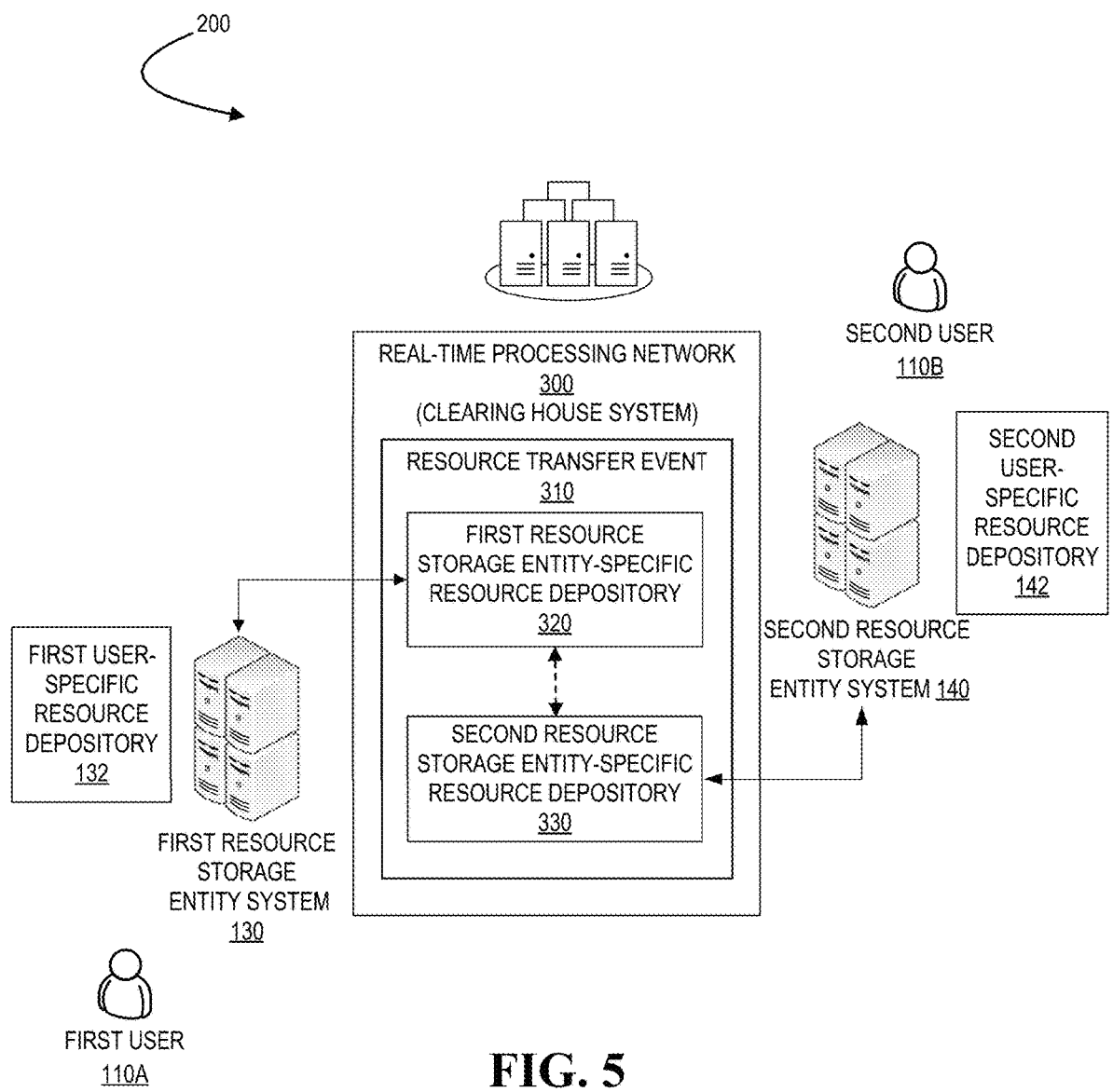
Figure 6:
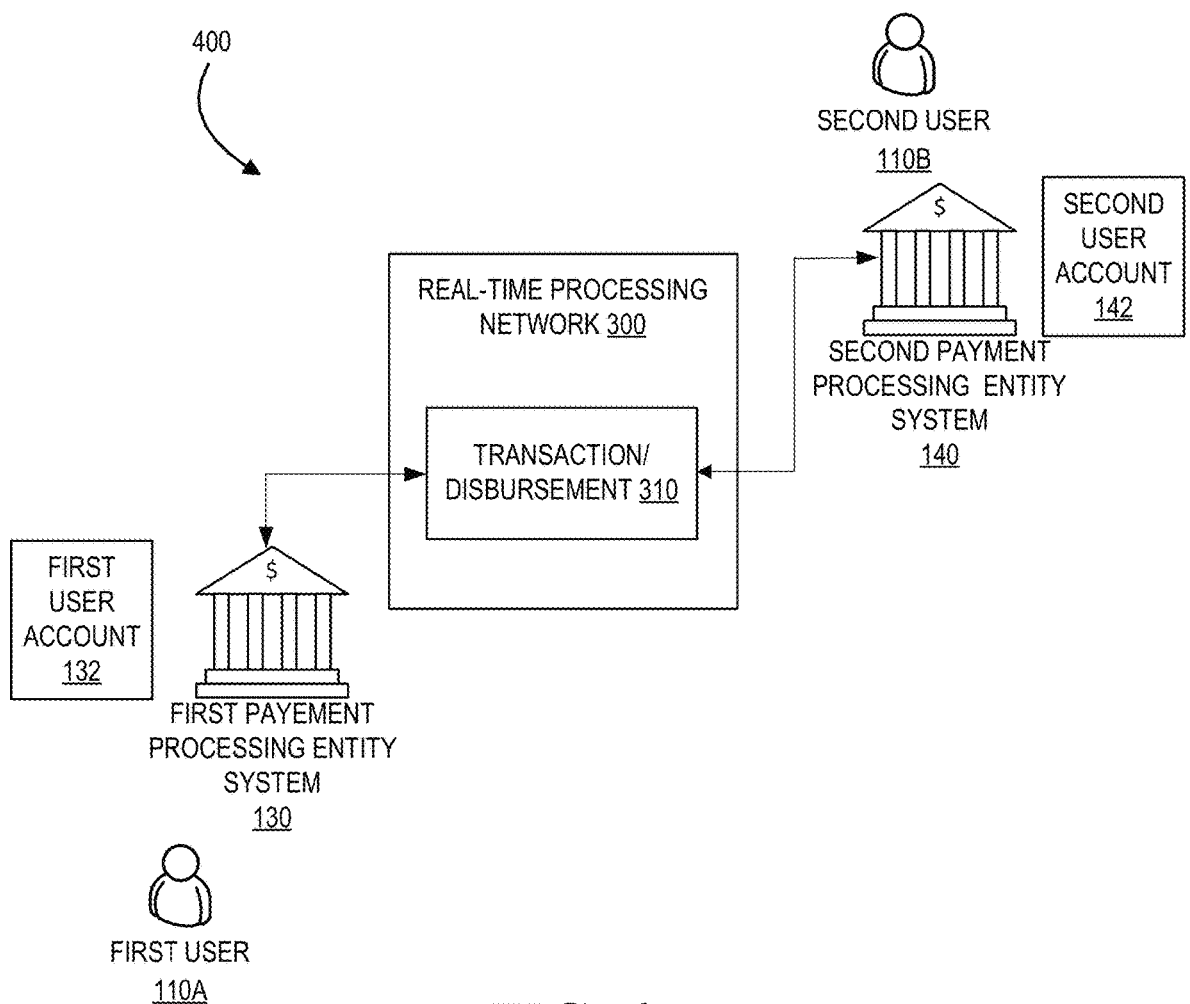
Figure 7:
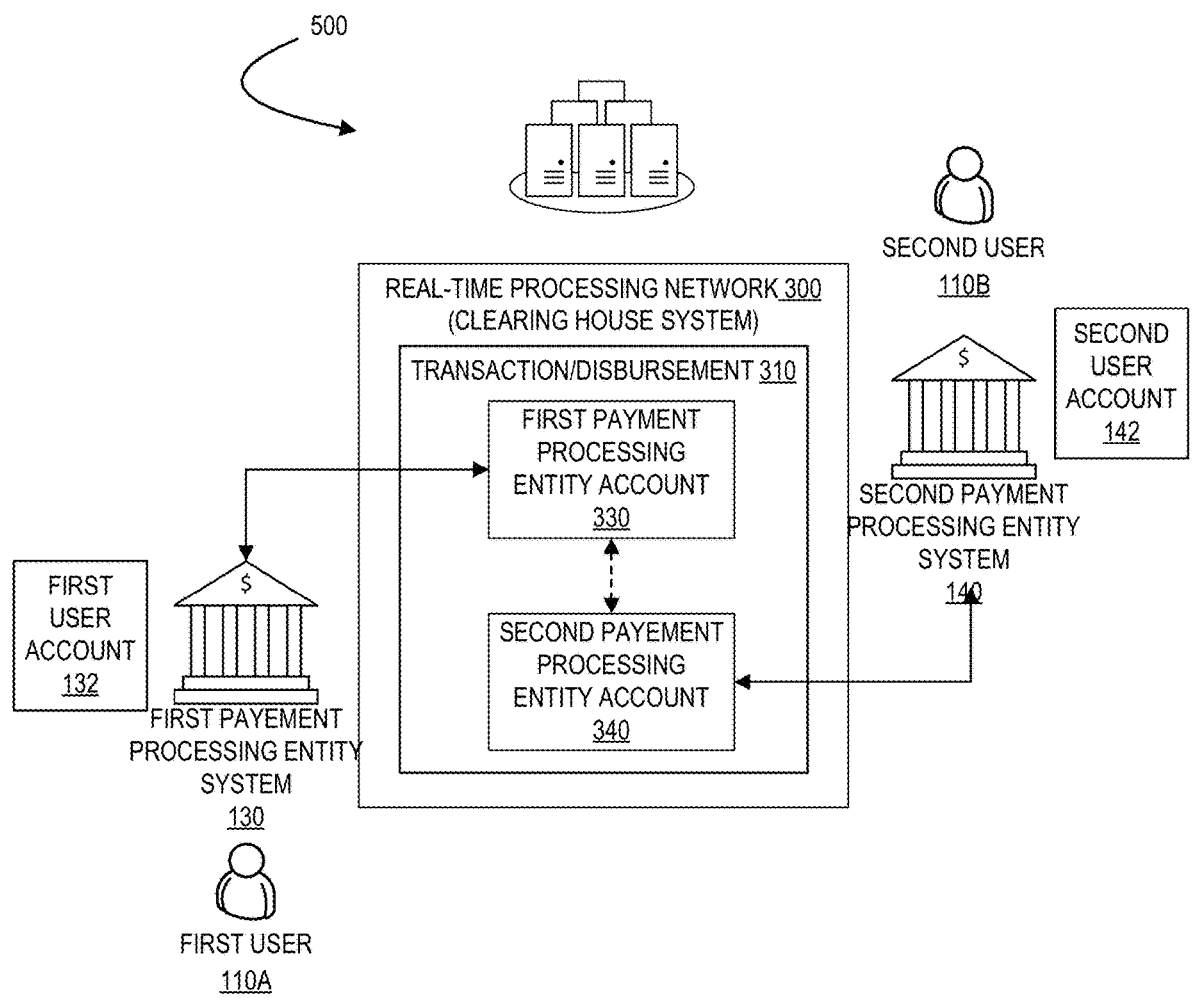
Figure 8:
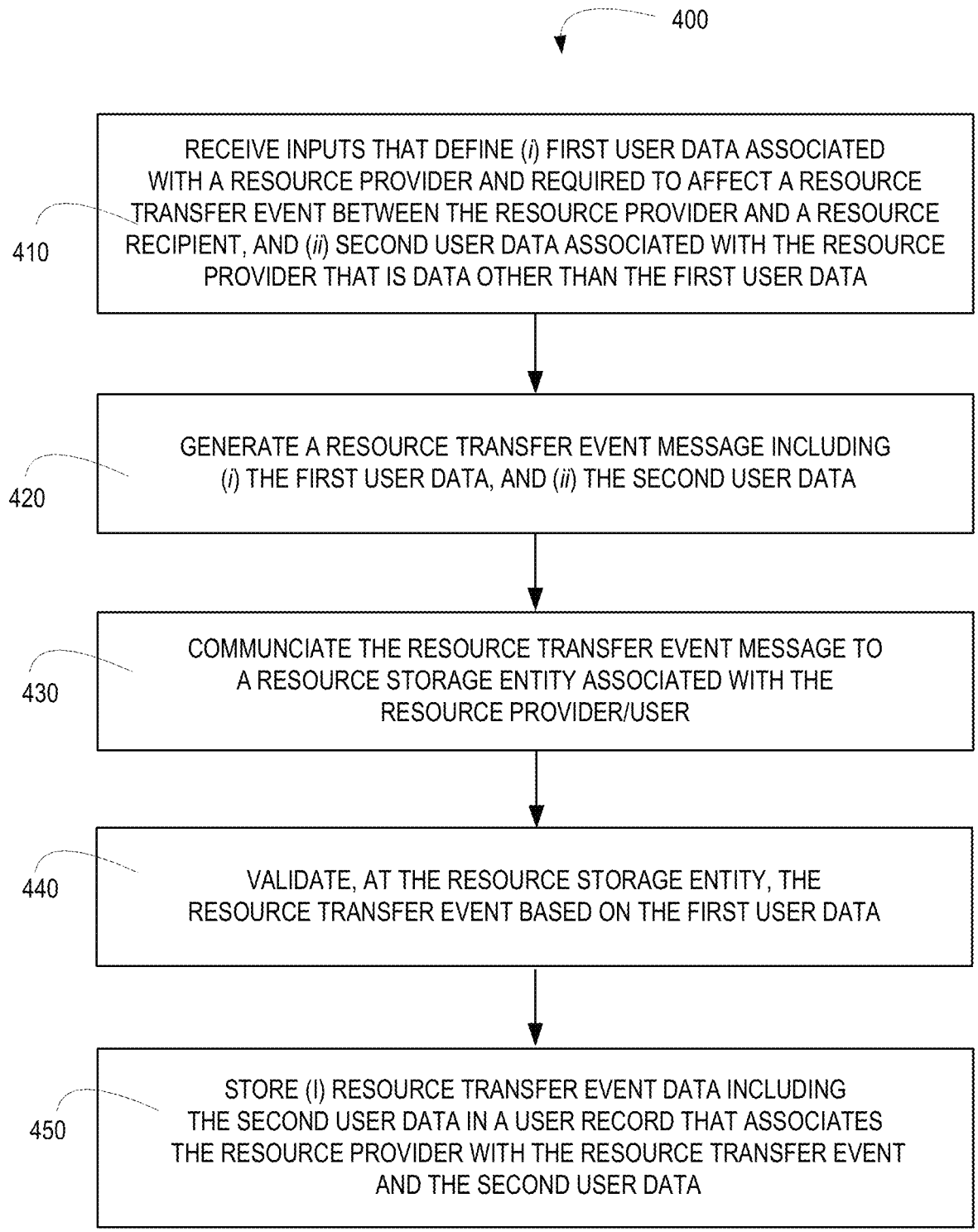
Figure 9:
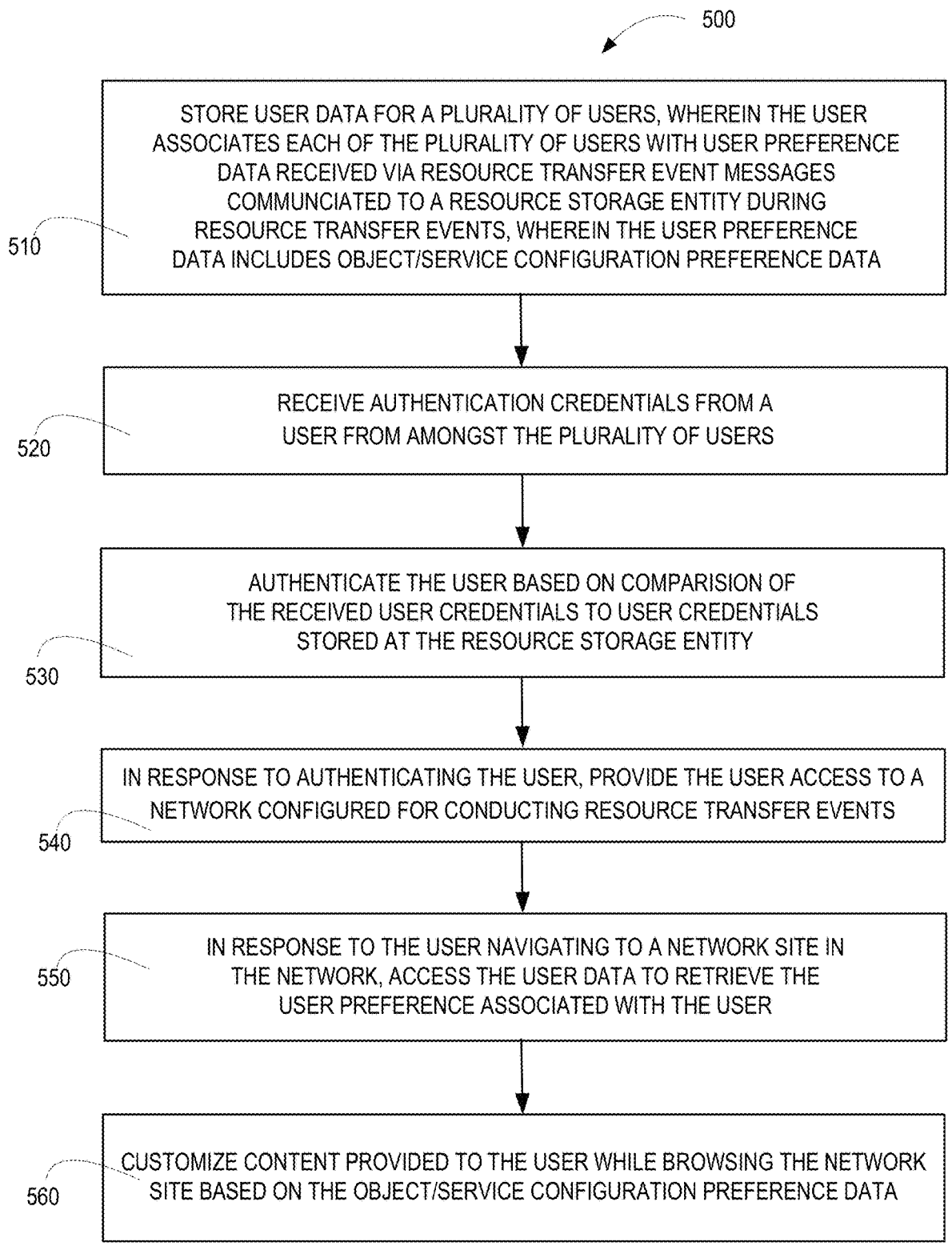

Having thus described embodiments of the disclosure in general terms, reference will now be made to the accompanying drawings, wherein:

FIG. 1 is a schematic/block diagram of a system for generating and communicating resource transfer messages including other user data besides the user' resource transfer event credentials, in accordance with embodiments of the present invention;

FIG. 2 is a schematic/block diagram of a system for leveraging other user data in resource transfer event messages, such as preference data, to customize/personalize a user browsing experience; in accordance with embodiments of the present invention;

FIG. 3 is a block diagram depicting exemplary resource transfer event messages used in conjunction with a real-time processing network; in accordance with embodiments of the present invention;

FIG. 4 is a schematic diagram of a system for processing resource transfer events in a real-time processing network, in accordance with some embodiments of the present disclosure;

FIG. 5 is a schematic diagram of a system for processing resources event in a real-time processing network using a clearing house system, in accordance with embodiments of the present invention;

FIG. 6 is a schematic diagram of a system for processing financial transactions/disbursements in a real-time processing network, in accordance with embodiments of the present invention;

FIG. 7 is a schematic diagram of a system for processing financial transactions/disbursements in a real-time processing network using a clearing house system, in accordance with embodiments of the present invention;

FIG. 8 is a flow diagram of a method for resource transfer event messaging, in accordance with embodiments of the present invention; and FIG. 9 is a flow diagram of a method for leveraging use of user preference data in resource transfer event messages to customize, personalize and/or refine user experiences at web sites, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below that leverage the use of additional user data in resource transfer event messaging for generating customized and refined browsing experiences. In this regard, resource transfer messages are configured to include, not only the user data required to affect the resource transfer (e.g., resource repository identifier and the like), but other user data related to the resource transfer event. The other user data may include, but is not limited to, user preference data, such as preferences (e.g., sizes, colors and the like) for the object or service being acquired, a geographic location preference for delivery of the object or performance of the service, a contact preference (e.g., email address, telephone number or the like) for corresponding with the resource provider and the like.

In specific embodiments of the invention, in which the resource transfer event message is a payment message communicated to a payment processing entity, such as a financial institution, the payment message will not only include data required to affect the payment (e.g., payment account identifier or the like), but also additional user data related to the payment. The additional user data may include user preference data such as, but not limited to, product/service preferences (e.g., size, color or the like), physical address preference for delivering the product or performing the service, and contact preference for contacting the payor.

The resource transfer event messages are communicated to the resource storage entity that is associated with the resource transfer event and stores the resource provider's resource repository. In this regard, the resource storage entity provides for a database or other storage mechanism that stores user records that associate the resource provider with the resource transfer event and include the other user data related to the resource transfer event. In those embodiments of the invention in which the resource transfer event message is a payment message, the payment processing entity provides for a database that stores user/customer records that associate the payor/customer with the payment and the other user data.

In response to a user authenticating with the resource storage entity and access a distributed communication network, such as the Internet or the like, the user records are accessed and the user's additional user data is used to customize the websites that the user navigates. In the specific embodiment of the invention, in which the resource transfer event message is a payment message, the user/customer subsequently authenticates with the payment processing entity and is granted access to an e-commerce network, such as the Internet. Once the user/customer navigates to e-commerce sites, the user records are accessed and the additional user information/preferences are used to customize the website as the user browses the site. In this regard the site may present to the user only those objects/services that meet the user preferences and, in some instances, only objects/service that are currently available/in-stock.

Moreover, in further specific embodiments of the invention, further logic, such as artificial intelligence or the like may be executed in conjunction with the additional user information (e.g., user preferences associated with objects/services previously acquired) to determine/refine the customization of the websites. In this regard, if the user preference data indicates that the user prefers a specific size in specific brand of clothing/footwear and the website only offers other brands, the logic may be implemented to determine the actual user preferred size in the other brands offered at the website.

In other specific embodiments of the invention, the additional user information is used in configuring a resource transfer event once a user selects an object or service for acquisition. In this regard, only a single user input may be required to acquire an object or service, since the resource storage entity stores in the user record all the additional information needed for configuring a resource transfer event, such as, but not limited to, object or service preferences (e.g., sizes, colors and the like), a geographic location preference for delivery of the object or performance of the service, a contact preference for corresponding with the resource provider and the like.

Referring to FIG. 1, a system 2 for resource transfer event messaging is presented, in accordance with embodiments of the present invention. The system is implemented in a distributed communication network 4, which may comprise one or more of the Internet, intranet(s), cellular network(s) or the like. The system 2 includes a first computing platform 6 having a first memory 8 and one or more first processing devices 10 in communication with the first memory 8. First computing platform 6 may be part of a resource event processing platform/network or part of a real-time resource transfer event processing platform/network.

First computing platform 6 may comprise one or more server devices or the apparatus may comprise one of the one or more other computing devices (e.g., mainframes, storage devices, personal computers (PCs) or the like) capable of executing computer-readable instructions, such as algorithms, modules, routines, applications and the like. First memory 8 may comprise volatile and non-volatile memory, such as read-only and/or random-access memory (RAM and ROM), EPROM, EEPROM, flash cards, or any memory common to computer platforms). Moreover, first memory 8 may comprise cloud storage, such as provided by a cloud storage service and/or a cloud connection service.

First processing device(s) 10 may be an application-specific integrated circuit ("ASIC"), or other chipset, logic circuit, or other data processing device. First processing device 8 may execute an application programming interface ("API") (not shown in FIG. 1) that interfaces with any resident instructions, such as first instructions 12 and sub-instructions associated therewith or the like stored in the first memory 8 of the first computing platform 6. First processing device 10 may include various processing subsystems (not shown in FIG. 1) embodied in hardware, firmware, software, and combinations thereof, that enable the functionality of first computing platform 6 and the operability of the first computing platform 6 on a distributed computing network 4. For example, processing subsystems allow for initiating and maintaining communications and exchanging data with other networked devices. For the disclosed aspects, processing subsystems of first processing device(s) 10 may include any subsystem used in conjunction with first instructions 12 and related sub-instructions, sub-routines, algorithms, sub-algorithms, modules, sub-modules thereof.

First computer platform 6 may additionally include a communications module (not shown in FIG. 1) embodied in hardware, firmware, software, and combinations thereof, that enables electronic communications between the first computing platform 6 and other networks, such as real-time processing network 300 (shown in FIGS. 4-7) and devices. Thus, communication module may include the requisite hardware, firmware, software and/or combinations thereof for establishing and maintaining a network communication connection.

First memory 8 stores first instructions 12 that are executable by at least one of the first processing device(s) 10 and are configured to generate and communicate a resource transfer event message 22 to a resource storage entity. In specific embodiments of the invention in which the resource transfer event message 22 is a payment message, the payment message is communicated to payment processing entity, such a financial institution or the like.

First instructions 12 are configured to receive inputs 13 that define (i) first user data 14 associated with the resource provider and required to affect a resource transfer event between a resource recipient and the resource provider. In specific embodiments of the invention, first user data 14 includes resource transfer event credentials 16, such as payment account identifier or the like. Additionally, inputs 13 define (ii) second user data 18 that is associated with the resource provider and is data other than the first user data 14. In specific embodiments of the system, second user data 18 includes user/resource provider preference data 20. For example, in those embodiments of the invention in which the resource transfer event is a payment event, the user/resource provider preference data may include, but is not limited to, object/service configuration preference data (e.g., size, color or the like), geographical location preference data indicating a delivery or performance location, contact preference data (e.g., email address, telephone number or the like). In specific embodiments of the invention the some or all of the inputs 13 may be received from one or more of the resource recipient, the resource storage entity, a web site, a web browser or the like.

First instructions 12 are further configured to generate a resource transfer event message 22 that includes the first data 14 and the second data 18 and communicate the message 22 to a resource storage entity associated with the resource provider. In specific embodiments of the invention, in which the resource transfer event is a payment event, the payment message is communicated to a payment processing entity, such as a financial institution or the like.

System 2 additionally includes a second computing platform 24 having a second memory 26 and one or more second processing devices 28 in communication with the second memory 28. Second computing platform 24 is part of a resource transfer event processing platform/network and, thus may be executed by a resource storage entity, such as a payment processing entity, e.g., a financial institution or the like.

Second computing platform 24 may comprise one or more server devices or the apparatus may comprise one of the one or more other computing devices (e.g., mainframes, storage devices, personal computers (PCs) or the like) capable of executing computer-readable instructions, such as algorithms, modules, routines, applications and the like. Second memory 26 may comprise volatile and non-volatile memory, such as read-only and/or random-access memory (RAM and ROM), EPROM, EEPROM, flash cards, or any memory common to computer platforms). Moreover, second memory 26 may comprise cloud storage, such as provided by a cloud storage service and/or a cloud connection service.

Second processing device(s) 28 may be an application-specific integrated circuit ("ASIC"), or other chipset, logic circuit, or other data processing device. Second processing device 28 may execute an application programming interface ("API") (not shown in FIG. 1) that interfaces with any resident instructions, such as second instructions 30 and sub-instructions associated therewith or the like stored in the second memory 26 of the second computing platform 24. Second processing device 28 may include various processing subsystems (not shown in FIG. 1) embodied in hardware, firmware, software, and combinations thereof, that enable the functionality of second computing platform 24 and the operability of the second computing platform 24 on a distributed computing network 4. For example, processing subsystems allow for initiating and maintaining communications and exchanging data with other networked devices. For the disclosed aspects, processing subsystems of second processing device(s) 28 may include any subsystem used in conjunction with second instructions 30 and related sub-instructions, sub-routines, algorithms, sub-algorithms, modules, sub-modules thereof.

Second computer platform 24 may additionally include a communications module (not shown in FIG. 1) embodied in hardware, firmware, software, and combinations thereof, that enables electronic communications between the second computing platform 24 and other networks, such as real-time processing network 300 (shown in FIGS. 4-7) and devices. Thus, communication module may include the requisite hardware, firmware, software and/or combinations thereof for establishing and maintaining a network communication connection.

Second memory 26 stores second instructions 30 that are executable by at least one of the second processing device(s) 28 and are configured to receive the resource transfer event message 22 and perform resource transfer event validation resource 32 based on the first user data 14. Resource transfer event validation 32 may include, but is not limited to, verifying (i) the resource transfer event credentials 16, (ii) sufficiency of available resources in the corresponding resource repository and the like. In addition, second instructions 22 are configured to store a user record 34 that associates the resource provider with the resource transfer event and the second user data.

Referring to FIG. 2, a system 40 for leveraging user data, specifically user preference data, included in resource transfer event messages for customizing/personalizing and/or refining a user's web browsing experience. The system is implemented in a distributed communication network 4, which may comprise one or more of the Internet, intranet(s), cellular network(s) or the like. The system 40 includes a first computing platform 42 having a first memory 44 and one or more first processing devices 46 in communication with the first memory 44. First computing platform 44 may be part of or in control of by a resource storage entity, such as a payment processing entity, e.g., a financial institution or the like.

First computing platform 42 may comprise one or more server devices or the apparatus may comprise one of the one or more other computing devices (e.g., mainframes, storage devices, personal computers (PCs) or the like) capable of executing computer-readable instructions, such as algorithms, modules, routines, applications and the like. First memory 44 may comprise volatile and non-volatile memory, such as read-only and/or random-access memory (RAM and ROM), EPROM, EEPROM, flash cards, or any memory common to computer platforms). Moreover, first memory 44 may comprise cloud storage, such as provided by a cloud storage service and/or a cloud connection service.

First processing device(s) 46 may be an application-specific integrated circuit ("ASIC"), or other chipset, logic circuit, or other data processing device. First processing device 46 may execute an application programming interface ("API") (not shown in FIG. 2) that interfaces with any resident instructions, such as user database 48 and sub-instructions associated therewith or the like stored in the first memory 44 of the first computing platform 42. First processing device 46 may include various processing subsystems (not shown in FIG. 2) embodied in hardware, firmware, software, and combinations thereof, that enable the functionality of first computing platform 42 and the operability of the first computing platform 42 on a distributed computing network 4. For example, processing subsystems allow for initiating and maintaining communications and exchanging data with other networked devices. For the disclosed aspects, processing subsystems of first processing device(s) 46 may include any subsystem used in conjunction with user database 48 and related sub-instructions, sub-routines, algorithms, sub-algorithms, modules, sub-modules thereof.

First computer platform 42 may additionally include a communications module (not shown in FIG. 2) embodied in hardware, firmware, software, and combinations thereof, that enables electronic communications between the first computing platform 42 and other networks, such as real-time processing network 300 (shown in FIGS. 4-7) and devices. Thus, communication module may include the requisite hardware, firmware, software and/or combinations thereof for establishing and maintaining a network communication connection.

First memory 44 stores user database 48 that is executable by at least one of the first processing device(s) 46 and are configured to store user data 52 for a plurality of users 50. The user data 52 associates each of the users 50 with user preference data 54 that has been received via a resource transfer event message 22 communicated to a resource storage entity during resource transfer events. The user preference data includes, but is not limited to, object/service configuration preference data (e.g., size, color or the like) related to objects/products and/or services acquired in previous resource transfer events.

System 40 additionally includes a second computing platform 58 having a second memory 60 and one or more second processing devices 62 in communication with the second memory 60. Second memory 60 stores instructions 64 that are executable by at least one of the second processing device(s) 62 and may be implemented in conjunction with a resource storage entity portal, such as a financial institution portal or any other application that provides network access or the like.

Second computing platform 58 may comprise one or more server devices or the apparatus may comprise one of the one or more other computing devices (e.g., mainframes, storage devices, personal computers (PCs) or the like) capable of executing computer-readable instructions, such as algorithms, modules, routines, applications and the like. Second memory 60 may comprise volatile and non-volatile memory, such as read-only and/or random-access memory (RAM and ROM), EPROM, EEPROM, flash cards, or any memory common to computer platforms). Moreover, second memory 60 may comprise cloud storage, such as provided by a cloud storage service and/or a cloud connection service.

Second processing device(s) 62 may be an application-specific integrated circuit ("ASIC"), or other chipset, logic circuit, or other data processing device. Second processing device 62 may execute an application programming interface ("API") (not shown in FIG. 2) that interfaces with any resident instructions, such as instructions 64 and sub-instructions associated therewith or the like stored in the second memory 60 of the second computing platform 58. Second processing device 62 may include various processing subsystems (not shown in FIG. 2) embodied in hardware, firmware, software, and combinations thereof, that enable the functionality of second computing platform 58 and the operability of the second computing platform 58 on a distributed computing network 4. For example, processing subsystems allow for initiating and maintaining communications and exchanging data with other networked devices. For the disclosed aspects, processing subsystems of second processing device(s) 62 may include any subsystem used in conjunction with instructions 64 and related sub-instructions, sub-routines, algorithms, sub-algorithms, modules, sub-modules thereof.

Second computer platform 58 may additionally include a communications module (not shown in FIG. 2) embodied in hardware, firmware, software, and combinations thereof, that enables electronic communications between the second computing platform 58 and other networks, such as real-time processing network 300 (shown in FIGS. 4-7) and devices. Thus, communication module may include the requisite hardware, firmware, software and/or combinations thereof for establishing and maintaining a network communication connection.

Instructions 64 are configured to receive authentication credentials 66 from one of the users 50 and, in response perform user authentication 68 by comparing the received authentication credentials 66 to authentication credentials 70 stored by the resource storage entity. In response to authenticating the user, instructions 64 are configured to provide the user access 72 a network 74 configured for performing resource transfer events.

In response to the user navigating to a network site 76 within network 74, instructions 64 are configured to access the user database 48 to retrieve the user preference 54, specifically object/service configuration data 56. Moreover, instructions 64 are configured to customize/personalize the content provided to the user while browsing the network site 76 based on the user preference data 54 associated with the user 50. In this regard, according to specific embodiments of the invention, instructions 64 implement user preference data 54 from previous resource transfer events to determine which content to present to the user as they browse the network site 76. For example, the content may be of a preferred size, color or some other configuration parameter associated with previous resource transfer events. Since the user preference data is stored by and retrieved from the resource storage entity, which in specific embodiments, is a financial institution or the like, the user does not have to hold an account at the network site 76 or otherwise store data, including the user preference data 54 at the network site 76 level or at the browser level, which are highly susceptible to data breaches or the like. The resource storage entity, such as a financial institution is a trusted entity and the communication links between the instructions 64 and the user database 48, used for accessing and retrieving data therefrom, may be secured communication channels, such as tunnel connections or the like.

Referring to FIG. 3 a block diagram is depicted that illustrates exemplary resource transfer event messaging implemented in conjunction with a real-time processing network, in accordance with embodiments of the present invention. Real-time processing networks, including real-time payment networks are discussed in detail infra. with respect to FIGS. 4-7. In specific embodiments of the invention, the real-time processing network 300 is configured to allow the second user/resource recipient 100B to generate and communicate a resource transfer event request message 23, which allows for the user 100B to include a request 25 for second user data 18 within the message 23. In specific embodiments of the invention, the request 25 for second user data 18, is a request for specific resource provider preference (s) 20, such as a request for object/service configuration preferences (e.g., size, color or the like), geographic location preference for delivery of an object/product or performance of a service, a contact preference, such as an email address, telephone number or the like.

The resource transfer event request message 23 is communicated to the first user/resource provider 100A via the real-time processing network 300. In response, the real-time processing network is configured to first user/resource provider 110A to generate and communicate a resource transfer event message 22 that includes first user data 14 that is required to affect the resource transfer event, such as resource transfer event credentials 16, which may comprise an resource account identifier, token or the like. In addition, the resource transfer event message 22 that includes second user 18, which includes responses to the specific request 25, such as resource provider preferences 20. The real-time processing network 300 receives the resource transfer event message 22 and processes the resource transfer event in real-time or near-real time to receiving the message. Real-time processing means that the resource transfer occurs, e.g., resources are distributed and settlement occurs between two or more resource storage entities, in real-time.

In addition, the real-time processing network 300 is configured to generate a second resource transfer event message that is communicated to the second user/resource recipient 100B and includes the second user data 18 which includes (i) responses to the specific request 25, such as resource provider preferences 20 and, in some embodiments, (ii) resource transfer event confirmation data 29 that confirms the resource transfer event. In this regard, the second user/resource recipient 100b receives resource transfer event confirmation 29 and requested second user data 18 in one consolidated message 27 from the real-time processing network 300. This serves two different technical benefits. First, by sending consolidated messages that include either (i) the resource transfer event request and the request for second user data, or (ii) the resource transfer event confirmation and requested second user data, it eliminates the need to communicate the request fir second user data and the second user data itself in separate messages. By not having to communicate the request for second user data and the second user data in separate messages, less burden is placed on the communication network (i.e., bandwidth used to communicate separate messages can be used for other purposes. Second, currently the requests for second user data and the second user data is communicated from and to the second user/resource recipient 110 by means other than the real-time processing network (i.e., text message, voice network or the like). Typically, such other means are less secure and/or reliable than the real-time processing network 300. Thus, the present invention also provides for heightened security and reliability in the communication of requests for second user data and the subsequent second user data.

In specific embodiments of the invention in which the resource transfer event is payment event and the real-time processing network is a real-time payment network, the messaging may be in accordance with International Organization of Standardization (ISO) 20022 standard for electronic data interchange between financial institutions. In such embodiments of the invention, PACO.13 (Party Contact Narrative) defines a postal address field and PAIN.008 (Payments Initiation) provides a field for a customer address. Additionally, ISO 20022 provides for an unstructured remittance in both the payment request and payment (i.e., credit transfer) message. In specific embodiments of the invention, an alphanumeric code may be employed in the unstructured remittance field such that, one or more character/number positions in the code corresponds to a different user preference datum (e.g., a different size, color or the like).

FIG. 4 illustrates a block diagram of a high-level real-time processing system 100, in accordance with embodiments of the present invention. In the illustrated system 100, a first user 110A is associated with a first resource storage entity system 130 and a second user 110B is associated with a second resource storage entity system 140. A real-time processing network 300 is configured to process, in real-time, a resource transfer event 310, in which first user 100a is the resource provider and second user 100b is the resource recipient. In specific embodiments of the invention, real-time processing provides for the resources to be available to the resource recipient immediately (i.e., once the real-time processing network 300 has completed processing the resource transfer event 310). In other embodiments of the invention, real-time processing provides for the resource transfer event 310 to be cleared/settled upon completion of processing by the real-time processing network 300. In specific embodiments of the invention, the real-time processing nature means that once the first user 100a initiates the resource transfer event 310, the resource transfer event is deemed irrevocable (i.e., the resource transfer event cannot be cancelled or otherwise prevented from completion).

In specific embodiments of the invention, the first user 110A and the second user 110B are users of the real-time processing system 100, such that, the first user 110A initiates a resource transfer event in which the second user 110B is the resource recipient. In specific embodiments of the invention, the first user 110A initiates the resource transfer event from the first resource storage entity system 130 by providing requisite authentication information, which serves to authenticate the identity of the first user 110A. In specific embodiments of the invention, authentication of an identity may include multi-factor/multi-step authentication (i.e., involving one or more computing devices) as required by information security standards and requirements. The first user 100A may also provide, as part of the authentication information, a resource depository identifier, which serves to identify a source for resources associated with the resource transfer event 310. In such embodiments of the invention, first resource storage entity system 130 may authenticate the validity of the resource depository and validate that the resource depository currently stores an adequate volume of resources to process the resource transfer event 310.

In specific embodiments of the invention, once the first user 100A initiates the resource transfer event 310, the second user 110B, as the resource recipient, receives communication, via the second resource storage entity system 140 to accept the resources (i.e., accept the resource transfer event) following performance of requisite user authentication requirements. Communication between first user 100A and second user 100B related to the resource transfer event is transmitted between the first and second resource storage entity systems 130 and 140 via the real-time processing network 300. The real-time processing network 300 is configured to directs the resources to the appropriate resource storage entity system associated with resource recipient, in this instance second resource storage entity system 140 associated with the second user 100*b*.

It should be understood that while the illustrated embodiment of FIG. 4 depicts only first and second users 100A and 100B, and first and second resource storage entity systems 130 and 140, in actual embodiments of a real-time processing network 300 numerous resource storage entity systems having corresponding numerous users may interact with the real-time processing network 300 to process, as needed, resource transfer events 310 in real-time.

In accordance with specific embodiments of the invention, the terms "resource storage entity system" may include any computing system comprising one or more computing devices (e.g., servers, storage devices, personal computers (PCs) and the like) associated with entity/organization having a need to process resource transfer events in real-time.

Furthermore, the term "user" may include a single individual or a group of individuals that desire to perform a resource transfer event in real-time. The "user", as referenced herein, may refer to an individual or group of individuals that has the ability and/or authorization to access and use one or more resources or portions of a resource and request and initiate real-time processing via the real-time processing network 300. Moreover, the association between the users and the resource storage entity systems may be a one-time association for the purpose of processing the resource transfer event in real-time or the association may be an ongoing association in which the users regularly process resource transfer events, those in real-time and otherwise, with the associated resource storage entity system.

As used herein, the term "user computing device" or "mobile device" or "communication device" may refer to mobile phones, personal computing devices, tablet computers, wearable devices, smart devices and/or any portable electronic device capable of receiving (wirelessly or otherwise) and/or storing data therein. A "user interface" is any device or software that allows a user to input information, such as commands or data, into a device, or that allows the device to output information to the user. For example, the user interface may include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system", as used herein, may refer to any information technology (IT) platform and may include a plurality of computing devices, such as servers, mainframes, personal computers, network devices (portable and otherwise), front and back end devices, database/storage devices and/or the like.

Referring to FIG. 5 a block diagram is depicted of a high-level real-time processing system 200, in accordance with one embodiment of the invention. In the illustrated embodiments, a first user 110A is associated with a first resource storage entity system 130 and a second user 110B is associated with a second resource storage entity system 140. The real-time processing network 300 is configured as a clearing house system in which the resource transfer event 310 is conducted between a first resource storage entity-specific resource depository 320 and a second resource storage entity-specific resource depository 330. The first resource storage entity-specific resource depository 320 and the second resource storage entity-specific resource depository 330 are accessible by each respective resource storage entity system, i.e., first resource storage entity-specific resource depository 320 is accessible to first resource storage entity system 130 and second-entity-specific resource depository 330 is accessible to second resource storage entity system 140. The real-time processing network 300 acts as a trusted intermediary during completion (e.g., clearing/settlement) of the resource transfer event 310. Resources are be transferred by each resource storage entity system 130 and 140 to and from their respective entity-specific resource depositories 320 and 330. Resource transfers between the first user-specific resource depository 132 and the second user-specific resource depository 142 are administered by the clearing house system 300 pending authentication and authorization of the users 110A and 100B and/or the user-specific resource depositories 132 and 142 as required by the resource transfer event 310.

The clearing house system of the real-time processing network 300 is configured to direct the resources to the appropriate resource storage entity system associated with the second user 100B (i.e., resource recipient). The transfer of resources occurs between the first resource storage entity-specific resource depository 320 and second resource storage entity-specific resource depository 330 on behalf of their associated users 110A and 110B, wherein the resource transfer event 310 may be cleared/settled at the resource storage entity systems immediately, concurrent with the completion of the resource transfer event. As settlement occurs between the representative resource storage entity systems 130 and 140, resources are deleted from and added to the corresponding user-specific resource depositories 132 and 142. As a result of the resource transfer event being is settled immediately, the resources are made available for use by the resource recipient (e.g., second user 100B) in real or near real-time.

In specific embodiments of the invention, the system 500 may further comprise more than one real-time processing network 300/clearing house system that receive and process resource transfer event requests as described herein.

Referring to FIG. 6 a block diagram is shown of a high-level real-time processing system 400, in accordance with embodiments of the present invention. In the illustrated system 100, a first user 110A is associated with a first payment processing entity system 130, such as a customer of a first financial institution and a second user 110B is associated with a second payment processing entity system 140, such as a customer of a second financial institution. In this regard the real-time processing network 300 otherwise referred to as a real-time payment (RTP) network is configured to process, in real-time, a resource transfer event in the form of a transaction/disbursement 310 of funds, in which first user 100a provides the funds and second user 100b receives the funds. In specific embodiments of the invention, real-time payment provides for the funds to be available to the recipient (i.e., second user/customer 100B) immediately (i.e., once the real-time payment network 300 has completed processing the transaction/disbursement 310). In other embodiments of the invention, real-time payment provides for the transaction/disbursement 310 to be cleared/settled upon completion of processing by the RTP network 300. In specific embodiments of the invention, the real-time aspect of RTP network 300 means that once the first user 100A initiates the transaction/disbursement 310, the transaction/disbursement 310 is deemed irrevocable (i.e., the transaction/disbursement cannot be cancelled, interrupted or otherwise prevented from completion/settlement) and the first user 100A bares an obligation to remit the funds to the second user 100B.

In specific embodiments of the invention, the RTP network 300 is configured to communicate in accordance with an industry-wide standard messaging protocol. For example, in specific embodiments of the invention, the messaging protocol may adhere to International Organization for Standardization (ISO) standard 20022, which detects the format and rules for communicating messages/commands between the payment processing entity systems 130 and 140 and the RTP network 300. In specific embodiments of the invention, the transaction/disbursement 310 may occur, in its entirety, via a series of messages communicated between the payment processing entities 130 and 140 via the RTP network 300. While in other embodiments of the invention, such as those, discussed in relation to FIG. 7, infra., the RTP network 300 will implement a clearing house system.

In specific embodiment of the invention, the first user 110A and the second user 110B are predetermined users (i.e., registered users) of the real-time processing system 400, wherein the first user 110A (i.e., the payor) initiates a credit transfer to the second user 110B (i.e., the payee). In specific embodiments of the invention, the first user 110A is required to initiate the transfer from the first payment processing entity system 130 in response to the first user 110a providing authentication information to authenticate the identity of the first user 110A and validity of the first user account 132 held at the first payment processing entity system 130. The authentication information may include account numbers, routing numbers, PIN numbers, username and password, date of birth, social security number, or the like, or other authentication information as described herein. As previously described, in some embodiments of the invention, user identity authentication may comprise multi-factor/multi-step authentication as prescribed by information security standards and requirements. In addition, the system 400 may provide for authorizing the transaction/disbursement 310 based on verifying the first user account 132 held at the first payment processing entity system 130 currently stores at least an adequate amount of available funds to fulfill the transfer/disbursement 310. While in certain embodiments of the invention, the first user 110a initiates the transfer from a physical, brick-and-mortar location of the first payment processing entity system 130, in alternative embodiments described herein, the transfer may be initiated from other locations in which the user is not required to be at a brick-and-mortar location (e.g., via an electronic application, a website, a point-of-sale (POS) device or the like).

Upon the first user 100A initiating transaction/disbursement 310, the second user 110B, as the payee, receives a communication to accept payment in response to the second user providing requisite authentication information and the system 400 verifying the identity of the second user and the validity of the second user account 142. As previously discussed, communication related to the transaction/disbursement 310 between first and second user 100A is transmitted between the first and second payment processing entity systems 130 and 140 via the real-time processing network 300 which directs the payment to the appropriate payment processing entity (e.g., second payment processing entity system 140) associated with the payment recipient (i.e., second user 100B). As settlement occurs between the representative first and second payment processing entity systems 130 and 140, debiting and crediting of individual user accounts (i.e., first and second user accounts 132 and 142) may be managed at each payment processing entity system. As the transaction/disbursement is settled immediately, funds may be made available for use by the recipient (i.e., second user 100B) in real or near real-time.

The payment processing entity systems 130 and 140 may be associated with financial institutions or any other entity/organization that processes financial transactions/disbursements or the like. Additionally, it should be appreciated by someone with ordinary skill in the art that the user may be an existing customer of the financial institution or a potential customer of the financial institution or the like.

Referring to FIG. 7 a block diagram is depicted of a high-level real-time processing system 500, in accordance with one embodiment of the invention. In the illustrated embodiments, a first user 110A is associated with a first payment processing entity system 130, such as a customer of a first financial institution and a second user 110B is associated with a second payment processing entity system 140, such as a customer of a second financial institution. The real-time processing network 300 is a real-time payment (RTP) network configured as a clearing house system in which the transaction/disbursement 310 is conducted between a first entity-specific account 330 and a second entity-specific account 340. The first entity-specific account 330 and the second entity-specific account 340 are accessible by each respective payment processing entity system, i.e., first entity-specific account 330 is accessible to first entity/financial institution system 130 and second entity-specific account 340 is accessible to second entity/financial institution system 140. The RTP network 300 acts as a trusted intermediary during settlement of the transaction/disbursement 310. Funds are be transferred by each payment processing entity system 130 and 140 to and from their respective entity-specific accounts 330 and 340. Fund transfers between the first user account 132 and the second user account 142 are administered by the clearing house system 300 pending authentication and authorization of the users 110A and 100B and/or the user accounts 132 and 142 as required by the transaction/disbursement 310.

The clearing house system of the RTP network 300 is configured to direct the funds to the appropriate payment processing entity system/financial institution associated with the second user 100B (i.e., payee). The transfer of funds occurs between the first payment processing entity account 330 and second payment processing entity account 340 on behalf of their associated users 110A and 110B. As such, the transaction/disbursement 310 may be cleared/settled at the payment processing entity systems/financial institutions immediately, concurrent with the completion of the transaction/disbursement. As settlement occurs between the representative payment processing entity systems/financial institutions 130 and 140, funds are debited and credited to the corresponding user accounts 132 and 142. As a result of the transaction/disbursement being is settled immediately, the funds are made available for use by the payee (e.g., second user 100B) in real or near real-time.

In specific embodiments of the invention, the system 300 may further comprise more than one RTP network 300/clearing house system that receive and process transaction/disbursement requests as described herein.

Referring to FIG. 8 a flow diagram is depicted of a method 400 for resource transfer event messaging, in accordance with embodiments of the present invention. At Event 410, inputs are received that define (i) first user data associated with a resource provider and required to affect a resource transfer event between the resource provider and a resource recipient, and (ii) second user data associated with the resource recipient, such as user preference data. In specific embodiments of the method, in which the resource transfer event is a payment event, the first user data may be the payor's payment credentials (e.g., account identifier or the like). The user preference data may include, but is not limited to, object/service configuration preference data (i.e., size, color and the like), geographic location preference data for delivering the object or performing the service, contact preference data (e.g., email address, telephone number or the like). The inputs may be received from the user/resource provider, the resource storage entity, such as a financial institution, a web browser or a web site or the like.

At Event 420, a resource transfer event message is generated that includes (i) the first user data and (ii) the second user data. In specific embodiments of the invention in which the resource transfer event is a payment event, the resource transfer event message may be a payment/credit transfer message or the like. At Event 430, the resource transfer event message is communicated to resource storage entity associated with the first user. In specific embodiments of the invention in which the resource transfer event is a payment event, the resource transfer event message is communicated to a payment processing entity, such as a financial institution at which the payor holds the payment account.

At Event 440, the resource storage entity validates the resource transfer event based on the first user data. In specific embodiments of the invention in which the resource transfer event is a payment event, the payment processing entity validates the payment transaction by verifying the payment credentials and, in some instances, sufficiency of resources/funds in the payment account.

At Event 450, a user record is stored at or by the resource storage entity that includes resource transfer event data and the second user data. The user record serves to associate the resource provider with the resource transfer event and the second user data.

In further embodiments of the method, in response to validating the resource transfer event, a second resource transfer event message is generated and communicated to the resource recipient that includes, but is not limited to, the second user data. In such embodiments the method, the resource recipient may not receive any other messages associated with the resource transfer event. In specific embodiments of the invention in which the resource transfer event is a payment event, the second resource transfer event message is a payment confirmation message communicated to the resource recipient that includes payment amount and the second user data, such as user preference data (e.g., product/service configuration preference data, physical address preference for delivering the product or performing the service, contact preference or the like).

In other specific embodiments of the method, the messaging may be implemented as part of a real-time processing network. In such embodiments of the invention, a resource transfer event request message may be initiated by the resource recipient and communicated to the resource provider. In such embodiments of the method, the resource transfer event request message is configured to allow for the resource recipient to input requests for second user data therein. In such embodiments of the method, the request message precedes receiving the inputs of the first and second user data and generating and communicating the resource event transfer message. In those embodiments of the method in which the resource transfer event is a payment event, the resource transfer event request message may be payment request message communicated from the payment requester/recipient/payee to the payment provider/payor.

Referring to FIG. 9 a flow diagram is depicted of a method 500 for leveraging user preference data communicated in resource transfer event messages to customize/personalize a user experience during web browsing, in accordance with embodiments of the present invention. At Event 510, user data is stored for a plurality of users. The user data associates each of the users with user preference data that has been received via resource transfer event messages communicated to a resource storage entity during resource transfer events. The user preference data includes object/server configuration preference data. In specific embodiments of the invention in which the resource transfer event is a payment event, the user preference data has been received via payment messages communicated to the payment processing entity as part of the payment event.

At Event 520, user authentication credentials are received from one of the users and, at Event 530, the user is authenticated by matching the received user authentication credentials with the user authentication stored at the resource storage entity. For example, specific embodiments of the invention in which the resource transfer event is a payment event, the user may authenticate with the payment processing entity, such as a financial institution or the like via a designated portal or via a widget implemented in conjunction with a web browser.

In response to authenticating the user, at Event 540, the user accesses a network configured for initiating resource transfer events. For example, specific embodiments of the invention in which the resource transfer event is a payment event, the user accesses the Internet. At Event 550, in response to the user navigating to a network site in the network, the stored user data is accessed and the user preference data associated with the user is retrieved.

At Event 560, content provided to the user while browsing the network site is customized/personalized based on the user preference data, specifically, the object/service configuration preference data. For example, if the object/service preference data indicates that the user prefers specific items of a specific size (e.g., shoes in size 10), the web site may be configured to only show the specific items offered and/or currently available in the specific size without the user otherwise having to make an input that notifies the website of their preferred size. As previously discussed, since the user preference data is stored at the resource storage entity-level, such as a payment processing entity-level, the data is deemed to be more securely and confidentially held than would be afforded if the data was stored either at the web browser-level or at the network site-level.

In other embodiments of the method, the user preference data includes a for delivery of the object or performance of the service, a contact preference (e.g., email address, telephone number or the like) for corresponding with the resource provider and the like. In related embodiments the method may further include the user/resource providing a single input at the network site for acquisition of an object/product or performance of a service. In such embodiments of the method, in response to receiving the single input or prior to the single input, the resource storage entity is accessed to obtain the resource transfer event credentials, such as, as payment credentials associated with the user/resource provider and the user database is accessed to obtain the user preference data including, but not limited to, user configuration preference data, such as preferences (e.g., sizes, colors and the like) for the object or service being acquired, a geographic location preference for delivery of the object or performance of the service, a contact preference (e.g., email address, telephone number or the like) for corresponding with the resource provider and the like. In response, the resource transfer event is processed using only the resource transfer event credentials and the user preference data obtained from the resource storage entity and user database. In those embodiments of the invention in which the resource storage event is a payment event, the user provides a single input and all of the information needed to process the payment event (i.e., payment credentials, delivery address, product configuration info and contact information) is obtained from the payment processing entity. In addition to the user benefitting from an actual "one input" (i.e., single click) transaction, the information that is used to process the transaction is stored and retrieved from a trusted entity (i.e., the payment processing entity, such as a financial institution or the like) and, thus, the user is not required to store the information at the less secure web browser and/or web site level.

In specific embodiments of the method, the resource transfer event messages that include the user preference data implicate a real-time processing network. In those embodiments of the invention in which the resource storage event is a payment event, the resource transfer event message is payment/credit transfer message. In such embodiments of the method, communication of the resource transfer event message may be preceded by a resource transfer event request message. In those embodiments of the invention in which the resource storage event is a payment event, the resource transfer event request message is payment request message. In such embodiments of the invention, the resource transfer event request message may be configured to allow the user to configure the message with specific user preference data request, such as requests for product configuration preferences, delivery address or service performance address, contact preference or the like.

In further specific embodiments of the method, once the preference data is accessed, logic may be implemented, such as artificial intelligence or the like, to determine actual user preferences applicable to the network site. For example, the network site may be specific to a particular brand of products and the stored user preference data may be associated with one or more different brands of products. In such instances, the logic may be implemented to determine the user preference (e.g., size) to the brand offered at the network site based on the stored user preference data associated with the other brands. For example, the user preference data may indicate that the user has a preference for size 9 shoes of brand XYZ, however the logic may determine that in brand ABC offered at the network site, the user's actual preference is for size 9½ shoes.

Thus, present embodiments of the invention provide systems, methods, computer program products and/or the like which leverage the use of additional user data in resource transfer event messaging for generating customized and refined browsing experiences. In additional, embodiments of the present invention provide for storing such additional user data at a highly secure and trusted entity, such as a resource storage entity/payment processing entity and not at the website or within the browser. Thus, resource transfer events/payment events can be initiated with user preference data stored and provided by the secure/trusted entity as opposed to storing the user preference data at the less secure websites or browser-level.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for customizing network browsing experiences, the system comprising:
    a first computing platform including a first memory and at least one first processor in communication with the first memory, wherein the first memory stores user database that is controlled by a resource storage entity, executable by the at least one first processor and configured to:
    store user data for a plurality of users, wherein the user data associates each of the plurality of users with user preference data received via resource transfer event messages communicated to the resource storage entity during resource transfer events, wherein the user preference data includes (i) object or service configuration preference data, (ii) a geographic location preference for distributing objects or performing services acquired in a resource transfer event, and (iii) a contact information preference including at least one of an email address and a telephone number; and a second computing platform including a second memory and at least one second processor in communication with the second memory, wherein the second memory stores instructions that are executable by the at least one second processor and configured to:

receive authentication credentials from a user from amongst the plurality of users, authenticate the user based on comparing the received authentication credentials and user authentication credentials stored at the resource storage entity, in response to authenticating the user, provide the user access to a network configured for resource transfer events, in response to the user navigating to a network site in the network, access the user database to retrieve the user preference data associated with the user, and customize content provided to the user while browsing the network site based on the object or service configuration preference data.

2. The system of claim 1, wherein the instructions are further configured to:

in response to receiving a single user input that selects an object or service at the network site for acquisition or performance, access the resource storage entity to obtain (i) resource transfer event credentials associated with the user, access the user database to obtain (ii) the user preference data associated with the user including one or more of (a) the object or service configuration preference data, (b) the geographic location preference, and (c) the contact information preference, and process the resource transfer event using only the resource transfer event credentials and the user preference data obtained by accessing the resource storage entity and the user database.

3. The system of claim 1, wherein the user database is further configured to:

store user data for a plurality of users, wherein the user data associates each of the plurality of users with the user preference data received via resource transfer event messages communicated to the resource storage entity during the resource transfer events, wherein the resource transfer event messages are further defined as real-time processing messages communicated within a real-time processing network.

4. The system of claim 3, wherein the user database is further configured to:

store user data for a plurality of users, wherein the user data associates each of the plurality of users with the user preference data received via resource transfer event messages communicated to the resource storage entity during the resource transfer events, wherein the real-time processing messages are communicated in response to receiving a real-time resource transfer event request message that includes a request for user preference data.

5. The system of claim 1, wherein the instructions are further configured to:

customize the content provided to the user by implementing artificial intelligence logic to determine one or more actual user preferences for the user by comparing data associated with objects or services offered at the network site with the user preference data.

6. The system of claim 1, wherein the instructions are further configured to:

customize the content provided to the user, wherein customizing includes presenting only objects or services that meet object or service configuration preferences and are currently available for acquisition or performance at the network site.

7. A computer-implemented method for customizing network browsing experiences, the method is executable by one or more computing processing devices and comprises:

storing user data for a plurality of users, wherein the user data associates each of the plurality of users with user preference data received via resource transfer event messages communicated to a resource storage entity during resource transfer events, wherein the user preference data includes (i) object or service configuration preference data, (ii) a geographic location preference for distributing objects or performing services acquired in a resource transfer event, and (iii) a contact information preference including at least one of an email address and a telephone number;

receiving authentication credentials from a user from amongst the plurality of users, authenticating the user based on comparing the received authentication credentials and user authentication credentials stored at the resource storage entity;

in response to authenticating the user, providing the user access to a network configured for resource transfer events;

in response to the user navigating to a network site in the network, accessing the user data to retrieve the user preference data associated with the user; and customizing content provided to the user while browsing the network site based on the object or service configuration preference data.

8. The computer-implemented method of claim 7, further comprising:

in response to receiving a single user input that selects an object or service at the network site for acquisition or performance, accessing the resource storage entity to obtain (i) resource transfer event credentials associated with the user;

accessing the user database to obtain (ii) the user preference data associated with the user including one or more of (a) the object or service configuration preference data, (b) the geographic location preference, and (c) the contact information preference; and processing the resource transfer event using only the resource transfer event credentials and the user preference data obtained by accessing the resource storage entity and the user database.

9. The computer-implemented method of claim 7, wherein storing the user data further comprises:

storing the user data for the plurality of users, wherein the user data associates each of the plurality of users with the user preference data received via resource transfer event messages communicated to the resource storage entity during the resource transfer events, wherein the resource transfer event messages are further defined as real-time processing messages communicated within a real-time processing network.

10. The computer-implemented method of claim 9, wherein storing the user data further comprises:

storing the user data for the plurality of users, wherein the user data associates each of the plurality of users with the user preference data received via resource transfer event messages communicated to the resource storage entity during the resource transfer events, wherein the real-time processing messages are communicated in response to receiving a real-time resource transfer event request message that includes a request for user preference data.

11. The computer-implemented method of claim 7, wherein customizing the content further comprises:
customizing the content provided to the user by implementing artificial intelligence logic to determine one or more actual user preferences for the user by comparing data associated with objects or services offered at the network site with the user preference data.

12. The computer-implemented method of claim 7, wherein customizing the content further comprises:
customizing the content provided to the user, wherein customizing includes presenting only objects or services that meet object or service configuration preferences and are currently available for acquisition or performance at the network site.

13. A computer program product comprising:
a non-transitory computer-readable medium comprising:
a first set of codes for causing a computer to store user data for a plurality of users, wherein the user data associates each of the plurality of users with user preference data received via resource transfer event messages communicated to a resource storage entity during resource transfer events, wherein the user preference data includes (i) object or service configuration preference data, (ii) a geographic location preference for distributing objects or performing services acquired in a resource transfer event, and (iii) a contact information preference including at least one of an email address and a telephone number;
a second set of codes for causing a computer to receive authentication credentials from a user from amongst the plurality of users;
a third set of codes for causing a computer to authenticate the user based on comparing the received authentication credentials and user authentication credentials stored at the resource storage entity;
a fourth set of codes for causing a computer to, in response to authenticating the user, provide the user access to a network configured for resource transfer events;
a fifth set of codes for causing a computer to, in response to the user navigating to a network site in the network, access the user data to retrieve the user preference data associated with the user; and
a sixth set of codes for causing a computer to customize content provided to the user while browsing the network site based on the object or service configuration preference data.

14. The computer program product of claim 13, wherein the computer-readable medium further comprises:
a seventh set of codes for causing a computer to, in response to receiving a single user input that selects an object or service at the network site for acquisition or performance, (i) access the resource storage entity to obtain resource transfer event credentials associated with the user, (ii) access the user database to obtain the user preference data associated with the user including one or more of (b) the object or service preferences, (b) the geographic location preference, and (c) the contact information preference, and (iii) process the resource transfer event using only the resource transfer event credentials and the user preference data obtained by accessing the resource storage entity and the user database.

15. The computer program product of claim 13, wherein the first set of codes are further configured to cause the computer to store the user data for the plurality of users, wherein the user data associates each of the plurality of users with the user preference data received via resource transfer event messages communicated to the resource storage entity during the resource transfer events, wherein the resource transfer event messages are further defined as real-time processing messages communicated within a real-time processing network.

16. The computer program product of claim 13, wherein the first set of codes are further configured to cause the computer to store the user data for the plurality of users, wherein the user data associates each of the plurality of users with the user preference data received via resource transfer event messages communicated to the resource storage entity during the resource transfer events, wherein the real-time processing messages are communicated in response to receiving a real-time resource transfer event request message that includes a request for user preference data.

17. The computer-program product of claim 13, wherein the sixth set of codes is further configured to cause the computer to customize the content provided to the user by implementing artificial intelligence logic to determine one or more actual user preferences for the user by comparing data associated with objects or services offered at the network site with the user preference data.

* * * * *